United States Patent
Cohen et al.

(10) Patent No.: US 6,862,884 B2
(45) Date of Patent: Mar. 8, 2005

(54) MASTER CYLINDER

(75) Inventors: Rudolf Cohen, Kesselheim (DE); Frank Goerlitz, Mülheim-Kärlich (DE); Leopoldo Palacids Gonzalo, Navarra (ES); Christoph Münz, Nauort (DE)

(73) Assignee: Lucas Automotive GmbH (DE)

( * ) Notice: Subject to any disclaimer, the term of this patent is extended or adjusted under 35 U.S.C. 154(b) by 6 days.

(21) Appl. No.: 10/645,935

(22) Filed: Aug. 22, 2003

(65) Prior Publication Data
US 2004/0060782 A1 Apr. 1, 2004

Related U.S. Application Data

(63) Continuation of application No. PCT/EP02/01854, filed on Feb. 21, 2002.

(30) Foreign Application Priority Data

Feb. 23, 2001 (DE) .......................... 101 08 775

(51) Int. Cl.$^7$ ................................ B60T 11/28
(52) U.S. Cl. .............................. 60/589; 60/562; 92/168
(58) Field of Search ...................... 60/589, 562; 92/168

(56) References Cited

U.S. PATENT DOCUMENTS

| | | | |
|---|---|---|---|
| 4,242,869 A | | 1/1981 | Sakazume |
| 4,531,452 A | | 7/1985 | Spielmann et al. |
| 4,532,856 A | | 8/1985 | Taylor |
| 4,781,024 A | * | 11/1988 | Nakamura ............... 92/168 |
| 5,941,071 A | * | 8/1999 | Simon Bacardit ......... 60/562 |
| 6,065,292 A | * | 5/2000 | Unterberg ............... 60/589 |
| 6,203,022 B1 | * | 3/2001 | Struschka et al. ........... 60/589 |

FOREIGN PATENT DOCUMENTS

| | | |
|---|---|---|
| DE | 42 25 556 | 2/1994 |
| DE | 195 05 115 | 8/1996 |
| DE | 196 10 834 | 6/1997 |
| DE | 198 13 494 | 10/1999 |

* cited by examiner

Primary Examiner—Edward K. Look
Assistant Examiner—Michael Leslie
(74) Attorney, Agent, or Firm—MacMillan, Sobanski & Todd, LLC

(57) ABSTRACT

A master cylinder (10) for a vehicle hydraulic brake system has a housing (12), which has a bore (14), which extends along a longitudinal axis (A) and is sealingly closed at one end by an end wall forming part of the housing (12) of the master cylinder (10) and at the other, opposite end by a closure element (16). A piston (18), which is guided in the bore (14), extends in a sealing and axially displaceable manner through the closure element (16). A central valve (20) is formed on the piston (18) and enables a fluid connection between a fluid reservoir and a pressure chamber (28) delimited in the bore (14) by the end wall and the piston (18) and, in the non-actuated state of the piston (18), is held in open position by an abutment component (34) acting upon the closure element (16). The closure element (16) is formed by two annular, axially mutually adjoining parts (42, 44), which are releasably connected to one another and of which the first part (42) facing the bore (14) is made of an elastomer material and the second part (44) remote from the bore (14) is made of a rigid material. For easy and reliable assembly, the part (44) of the closure element (16) remote from the bore (14) has at least two compliant detent arms (57), which interact with a detent groove (66) formed in the housing (12).

4 Claims, 2 Drawing Sheets

MASTER CYLINDER

CROSS REFERENCE TO RELATED APPLICATIONS

This application is a continuation of International Application No. PCT/EP 02/01854 filed Feb. 21, 2002, the disclosures of witch are incorporated herein by reference, and witch claimed priority to German Patent Application No.101 08 775.6 filed Feb. 23, 2001, the disclosures of witch are incorporated herein by reference.

BACKGROUND OF THE INVENTION

The invention relates to a master cylinder, often also called a master brake cylinder, for a vehicle hydraulic brake system having a housing, which has a bore, which extends along a longitudinal axis and is sealingly closed at one end by an end wall forming part of the housing of the master cylinder and at the other, opposite end by a closure element, having a piston, which is guided in the bore and extends in a sealing and axially displaceable manner through the closure element, and having a central valve, which is formed on the piston and enables a fluid connection between a fluid reservoir and a pressure chamber delimited in the bore by the end wall and the piston and which in the non-actuated state of the piston is held in open position by an abutment component acting upon the closure element, wherein the closure element is formed by two annular, axially mutually adjoining parts releasably connected to one another, of which the first part facing the bore is made of an elastomer material and the second part remote from the bore is made of a rigid material. Such a master cylinder is known from DE 196 10 834 C1, witch is incorporated by reference herein.

Master cylinders of said type are used in vehicles above all together with brake-pressure control systems, wherein nowadays said brake-pressure control systems often have the function of preventing both locking of the vehicle wheels during braking (so-called antilock system) and spinning of the driving wheels during acceleration, in particular on a slippery road surface, (so-called traction control).

In the non-actuated state of the master cylinder, i.e. when the piston is in its neutral or home position, the central valve disposed in the piston is held open by an abutment component, which is connected to the central valve and supported directly or indirectly against the end face, facing it, of the part of the closure element made of elastomer material. Upon actuation of the master cylinder, the piston with the central valve is displaced in actuating direction, wherein the abutment component detaches itself from the end face of the closure element and the central valve is closed. When after actuation of the master cylinder the piston moves back into its home position, the abutment component connected to it applies itself in a gentle and damped manner against the elastomer part of the closure element and the central valve is opened again.

The elastomer part and the part made of rigid material of the closure element are releasably connected to one another, wherein the part made of rigid material has an annular projection, which axially fully or almost fully penetrates the elastomer part. Consequently, upon a return motion of the piston into its home position the abutment component, immediately after gently applying itself against the elastomer part comes into contact with the rigid stop of the annular projection so that, irrespective of the pressure prevailing in the pressure chamber of the master cylinder, a clearly defined opening behaviour of the central valve is guaranteed.

For fastening the closure element in the bore formed in the housing of the master cylinder, at the side of the closure element facing the bore a stop plate is disposed, which is in contact with the elastomer part and is fixed in the bore by impact against a housing projection. Situated at the side remote from the bore is a snap ring, which is in contact with the part of the closure element made of rigid material and is latched in a groove formed in the inner periphery of the bore.

SUMMARY OF THE INVENTION

An object of the present invention is to make available a master cylinder having a closure element, which is easier and faster to assemble yet may be assembled securely.

Proceeding from the initially described prior art, said object is achieved according to the invention in that the part of the closure element remote from the bore has at least two compliant detent arms, which interact with a detent groove formed on the housing of the master cylinder. Said arrangement allows the complete closure element to be assembled in the most simple manner. During positioning of the closure element, an elastic deformation of the compliant detent arms occurs and the restoring forces resulting therefrom guarantee a secure latching of the detent arms in the detent groove formed in the housing of the master cylinder as soon as the closure element is situated in its predetermined position.

The detent arms are preferably formed integrally with the part of the closure element made of rigid material and remote from the bore. The component is therefore easy and inexpensive to manufacture, e.g. as a plastic injection-moulded part.

The formation of the detent arms on the part of the closure element remote from the bore may be effected in various ways. According to one embodiment of the present invention each detent arm comprises a first portion, which extends in axial direction towards the bore along the outer periphery of the housing, and a detent portion, which projects radially inwards from the first portion. The detent portion interacts with a detent groove formed in the outer periphery of the housing. Said development of the master cylinder according to the invention enables a particularly reliable assembly of the closure element because easy visual inspection of the latching of the detent portions in the detent groove is possible.

In a preferred development of the invention the detent arms are formed on an annular carrier disk of the closure element, which carrier disk is disposed outside of the bore. Said carrier disk is in particular integrally connected to the part made of rigid material remote from the bore. Given said arrangement, the closure element may in a particularly simple and time-saving manner be pushed directly onto the master cylinder housing until the detent arms latch in the detent groove.

According to a further preferred embodiment of the master cylinder according to the invention each detent arm is disposed in the interior of the bore and comprises a first portion, which extends in axial direction away from the bore, and a detent portion, which projects radially outwards from the first portion. The detent portion interacts with a detent groove formed in the inner periphery of the bore. The arrangement of the detent arms in the interior of the bore avoids the risk of damage to the assembled closure element particularly during storage and transportation.

In a development of said embodiment the first portion of all detent arms is formed by a hollow-cylindrical wall portion, which extends from a base of the part of the closure element remote from the bore in axial direction away from the bore. During installation of the closure element, therefore, the hollow-cylindrical wall portion elastically deforms and builds up the restoring forces that allow the detent portions to latch into the detent groove.

According to a further embodiment of the present invention the detent arms are formed on a hollow-cylindrical extension, which is guided on an actuating extension of the piston.

Various objects and advantages of this invention will become apparent to those skilled in the art from the following detailed description of the prefered embodiment when read in light of the accompanying drawings.

DETAILED DESCRIPTION OF THE INVENTION

Figure 1:
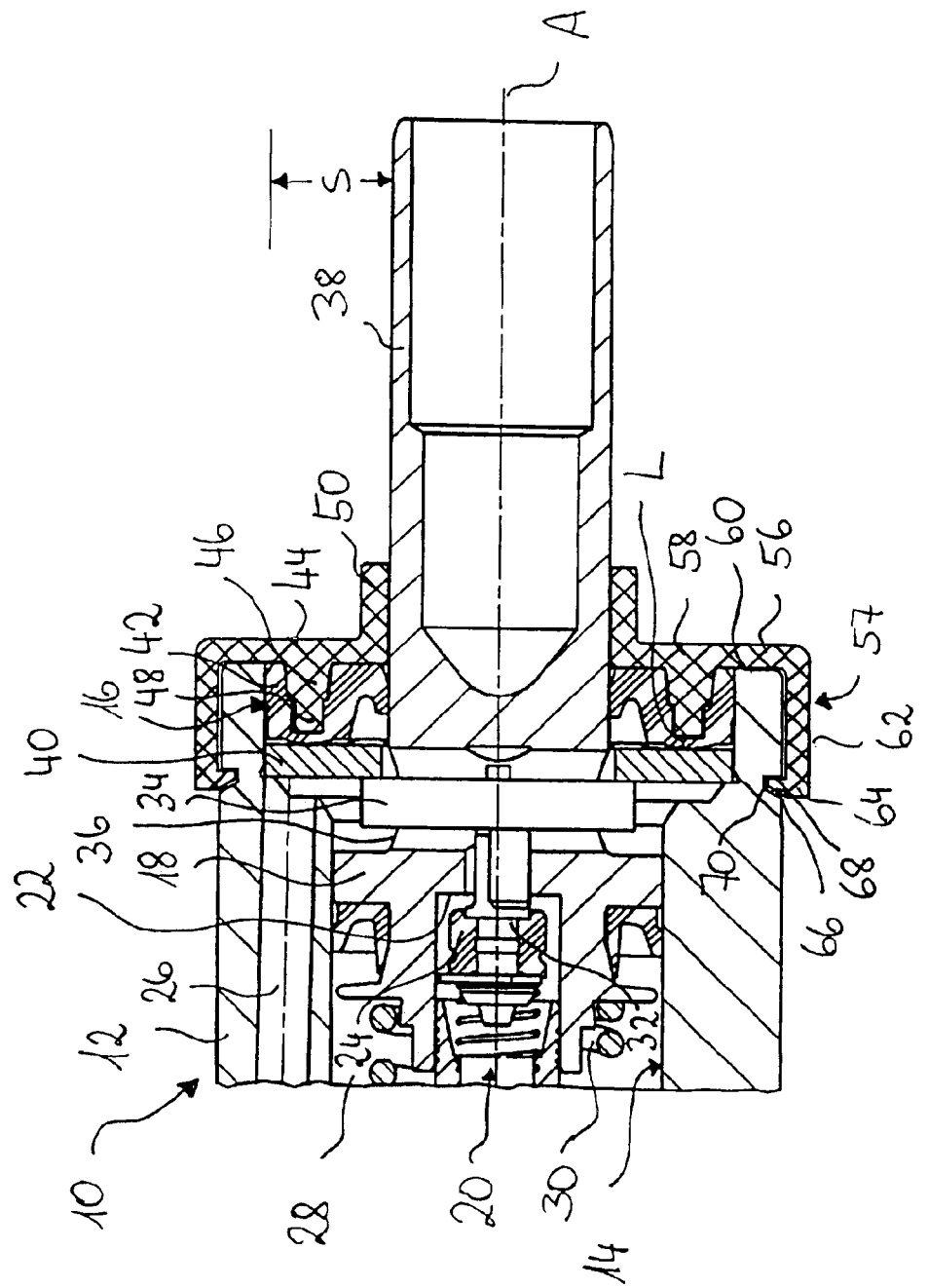
FIG. 1 an end portion of an embodiment of the master cylinder according to the invention in longitudinal section, and FIG. 2 an end portion of a further embodiment of the master cylinder according to the invention in longitudinal section.

FIG. 1 shows the force input end of a first embodiment of the master cylinder 10 according to the invention for a vehicle hydraulic brake system. The master cylinder 10 has an elongate housing 12 with a bore 14 extending along a longitudinal axis A. The one end (not shown here) of said bore 14 is usually closed in a sealing manner by an end wall forming part of the housing 12 of the master cylinder 10. The other, opposite end of the bore 14 is, as illustrated, closed in a sealing manner by a closure element 16.

In the bore 14 a piston 18 is accommodated in a sealing and axially displaceable manner adjacent to the closure element 16. Disposed in the piston 18 is a central valve 20 having a valve seat 22 and having an axially movable valve body 24 spring-biased in the direction of the valve seat 22. The central valve 20, in the illustrated open state, via a servo bore 26 clears a fluid connection between a non-illustrated fluid reservoir, which communicates with the servo bore 26, and a pressure chamber 28, which is delimited in the bore 14 between the piston 18 and the non-illustrated, closed one end of the bore 14. The piston 18 is shown in the drawing in its neutral or home position, which it occupies in the non-actuated state and into which it is biased in a conventional manner by means of a restoring spring 30. The non-illustrated parts of the master cylinder 10 are of a conventional, known design and are therefore not described in detail. Besides the illustrated piston 18, a second piston of a similar construction may be situated in the non-illustrated part of the master cylinder 10 and is then referred to as a secondary piston.

The valve body 24 of the central valve 20 has a pin-shaped extension 32, which extends through the piston 18 and to the free end of which a transverse pin 34 serving as a stop component is fastened. The transverse pin 34 is accommodated in a radial through-recess 36 of an actuating extension 38 of reduced diameter, which is integrally connected to the piston 18, extends through the closure element 16, projects from the housing 12 of the master cylinder 10 and is intended for connection to a non-illustrated, rod-shaped input member. When the piston 18 is in the illustrated neutral position, the transverse pin 34 therefore abuts an annular stop disk 40, which in turn is in contact with the end face of an elastomer part 42 forming part of the closure element 16, so that the central valve 20 is held in open position.

The closure element 16 further comprises a separate part 44, which axially adjoins the annular elastomer part 42, is likewise annular and is made of rigid material, e.g. of a suitable hard plastics material. At its end face facing the elastomer part 42 the part 44 made of rigid material has an annular, axially extending projection 46, which in the illustrated example tapers in the direction of its free end and the free end of which is formed by a row of pin-shaped extensions 48, which are spaced apart at regular intervals in peripheral direction and which likewise extend axially. As is evident from the drawing, the axial extension of the projection 46 (including its extensions 48) is so selected that the elastomer part 42 is axially almost fully penetrated by the projection 46. Between the end face of the elastomer part 42 in contact with the annular stop disk 40 and the end surface of each of the pin-shaped extensions 48 there is only the clearance denoted by L. The greatest cross-sectional dimension of the projection 46, which in the illustrated embodiment owing to the conical configuration of the projection 46 is to be found at its base, is less than half the cross-sectional dimension S of the elastomer part 42. For improved guidance of the actuating extension 38 the part 44 of the closure element 16 has an integrally formed, hollow-cylindrical extension 50. The parts 42 and 44 of the closure element 16, which owing to the separate construction may be manufactured separately in an economical manner, are releasably connected to one another by joining together.

In the embodiment illustrated in FIG. 1 the part 44 of the closure element 16 has detent arms 57, which are integrally formed on an annular carrier disk 56. The carrier disk 56 is integrally formed on a base 58 of the part 44 and disposed entirely outside of the bore 14 in abutment with an annular end face 60 of the housing wall 12. The detent arms 57 are formed in each case by a first portion 62, which extends in axial direction along the outer periphery of the housing 12, and by a detent portion 64. The detent portion 64 projects radially inwards from the first portion 62 and interacts with a detent groove 66, which is formed in the outer periphery of the master cylinder housing 12. At their side facing the bore 14 the detent portion 64 and the detent groove 66 each have bevels 68, 70.

During assembly of the part 44 the bevels 68 of the detent portions 64 interact with the end face 60 of the housing wall 12 in such a way that, as the component 44 is pushed onto the master cylinder housing 12, the first portions 62 of the detent arms 57 are progressively elastically deformed in a radially outward direction. After sufficient deformation of the first portions 62 the detent portions 64 then slide over the outer periphery of the housing 12. Because of the bias force, which results from the elastic deformation of the first portions 62, the detent portions 64 automatically latch in the detent groove 66 as soon as the part 44 has reached its predetermined position and fix the part 44 in said position. As it is substantially the axially directed first portions 62 and not the detent portions 64 which experience the elastic deformation, the detent portions 64 are hardly tilted and may latch precisely and reliably into the detent groove 66. The bevel 70 of the detent groove 66, which is complementary to the bevel 68 of the detent portions 64, effects a secure fixing of the detent portions 64 in the detent groove 66.

Figure 2:
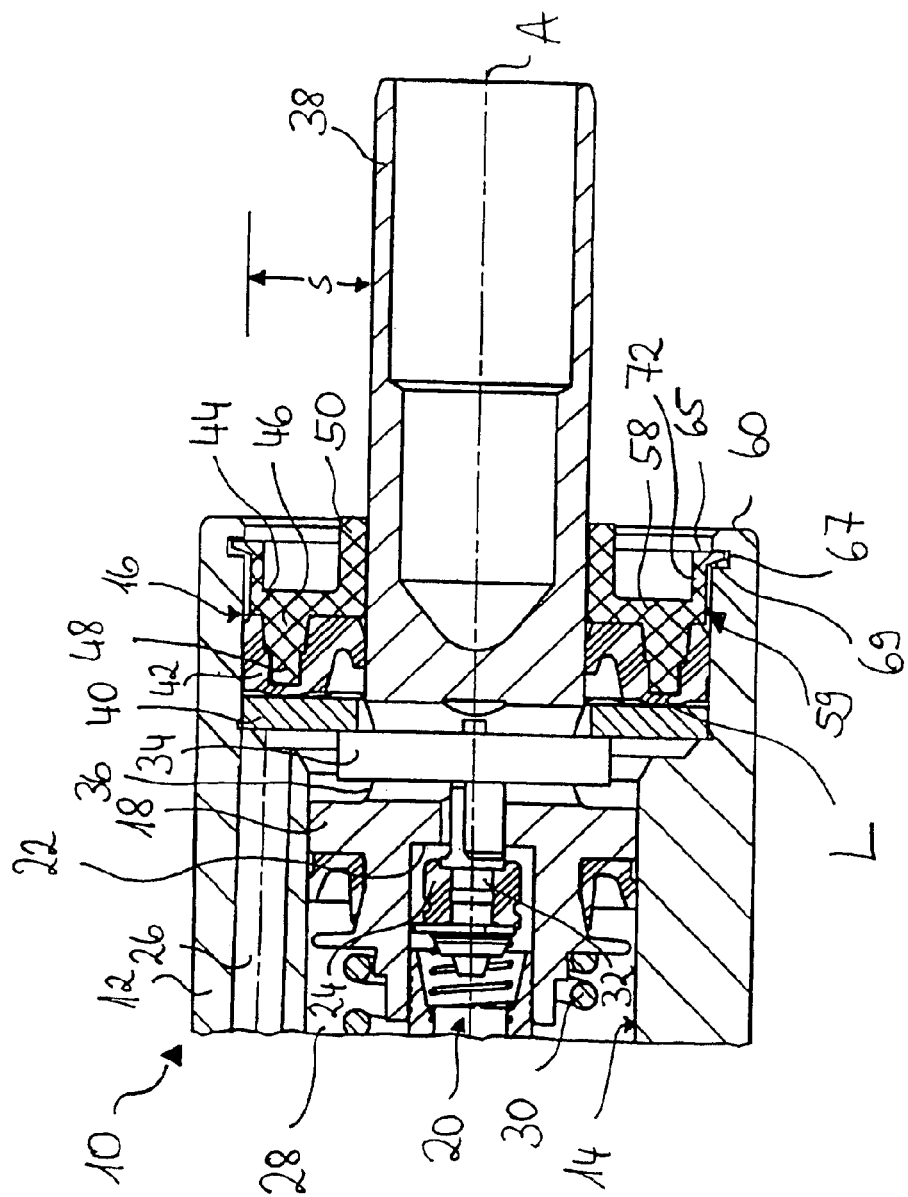

In the embodiment of the invention illustrated in FIG. 2 the part 44 of the closure element 16, in the installed state, is disposed entirely in the interior of the bore 14. The part 44 has detent arms 59 formed integrally on the annular base 58. A first portion of the detent arms 59, which extends in the interior of the bore in axial direction away from the bore 14, is formed by a hollow-cylindrical wall portion 72, which is integrally connected to the base 58. The outside diameters of the base 58 and the hollow-cylindrical wall portion 72 are in each case smaller than the inside diameter of the bore 14. Detent portions 65 project in a radially outward direction from the hollow-cylindrical wail portion 72 and interact with a detent groove 67, which is formed in the inner periphery of the bore 14. The detent portions 65 at their side facing the bore 14 have bevels 69.

During assembly the component 44 is introduced into the bore 14, wherein the bevels 69 of the detent portions 65 interact with the end face 60 of the housing wall 12 in such a way that the hollow-cylindrical wall portion 72 is progressively elastically deformed in a radially inward direction. Given suitable deformation of the hollow-cylindrical wall portion 72 the detent portions 65 then slide over the inner periphery of the bore 14. As a result of the restoring forces resulting from said elastic deformation the detent portions 65 of the detent arms 59 latch automatically in the detent groove 67 as soon as the component 44 has reached its predetermined position. As it is substantially the hollow-cylindrical wall portion 72 and not the detent portions 65 that experience the elastic deformation, the detent portions 65 are only slightly tilted and may latch precisely and reliably into the detent groove 67.

According to a further embodiment, which is not shown in FIG. 2, the detent groove 67 at its side facing the bore 14 also has bevels. Said bevel of the detent groove 67, which is complementary to the bevel 69 of the detent portions 65, effects a secure fixing of the detent portions 65 in the detent groove 67.

According to yet another embodiment, which is not shown in the drawings, the detent arms 57 are formed on the hollow-cylindrical extension 50 of the part 44. The detent arms 57 comprise a first portion, which projects radially outwards from the hollow-cylindrical extension 50, a second portion 62, which extends along the outer periphery of the housing 12 in axial direction away from the bore 14, and a detent portion 64, which projects radially inwards from the second portion 62. The detent portion 64 interacts with a detent groove 66 formed in the outer periphery of the housing 12.

In yet another embodiment (not shown) the detent arms 59 are formed likewise on the hollow-cylindrical extension 50 of the part 44. The detent arms 59 comprise a first portion, which projects radially outwards from the hollow-cylindrical extension 50, a second portion, which extends in axial direction away from the bore 14 in the interior of the bore 14, and a detent portion 65, which projects radially outwards from the second portion. The detent portion 65 interacts with a detent groove 67 formed in the inner periphery of the bore 14.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. Master cylinder for a vehicle hydraulic brake system having
  a housing, which has a bore, which extends along a longitudinal axis and which is sealingly closed at one end by an end wall forming part of the housing of the master cylinder and at the other, opposite end by a closure element,
  a piston, which is guided in the bore and extends in a sealing and axially displaceable manner through the closure element, and
  a central valve, which is formed on the piston and enables a fluid connection between a fluid reservoir and a pressure chamber delimited in the bore by the end wall and the piston and which in the non-actuated state of the piston is held in open position by an abutment component abutting a stop element, wherein the closure element is formed by two annular, axially mutually adjoining parts, which are releasably connected to one another and of which the first part facing the bore is made of an elastomer material and the second part remote from the bore is made of a rigid material, and wherein the part of the closure element remote from the bore has at least two compliant detent arms, which interact with a detent groove formed in the inner periphery of the bore,
  wherein each detent arm in the interior of the bore comprises a first portion, which extends in axial direction away from the bore, and a detent portion, which projects radially outwards from the first portion, wherein the detent portion extends substantially at right angles to the first portion, and wherein the stop element is in contact with an end face of the part of the closure element made of an elastomer material.

2. Master cylinder according to claim 1,
  wherein the detent arms are formed integrally with the part remote from the bore.

3. Master cylinder according to claim 1,
  wherein the first portion of all detent arms is formed by a hollow-cylindrical wall portion, which extends from a base of the part made of rigid material remote from the bore in axial direction away from the bore.

4. Master cylinder according to claim 1,
  wherein the detent arms are formed in a hollow-cylindrical extension of the part made of rigid material, which extension is guided on an actuating extension of the piston.

* * * * *